US008489317B2

United States Patent
Caveney et al.

(10) Patent No.: US 8,489,317 B2
(45) Date of Patent: Jul. 16, 2013

(54) SYSTEM AND METHOD FOR STOCHASTICALLY PREDICTING THE FUTURE STATES OF A VEHICLE

(75) Inventors: Derek Stanley Caveney, Ann Arbor, MI (US); Andrew James Frantz, Boulder, CO (US); Jeffrey Clark Lovell, Midland, MI (US); Lorenzo Caminiti, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 968 days.

(21) Appl. No.: 12/201,884

(22) Filed: Aug. 29, 2008

(65) Prior Publication Data

US 2010/0057361 A1    Mar. 4, 2010

(51) Int. Cl.
*G06F 17/10* (2006.01)

(52) U.S. Cl.
USPC .......................................................... 701/301

(58) Field of Classification Search
USPC .......................................................... 701/301
See application file for complete search history.

(56) References Cited

U.S. PATENT DOCUMENTS

| | | | | |
|---|---|---|---|---|
| 4,706,771 A * | 11/1987 | Kawabe et al. | ............. | 180/415 |
| 6,202,007 B1 * | 3/2001 | Spicer | ............................ | 701/3 |
| 6,240,367 B1 | 5/2001 | Lin | | |
| 6,408,245 B1 * | 6/2002 | An et al. | ..................... | 701/216 |
| 6,675,074 B2 | 1/2004 | Hathout et al. | | |
| 6,721,657 B2 * | 4/2004 | Ford et al. | ..................... | 701/213 |
| 6,816,799 B2 * | 11/2004 | Yu et al. | ........................ | 702/94 |
| 6,859,170 B2 * | 2/2005 | Devereux et al. | ......... | 342/357.29 |
| 6,907,391 B2 * | 6/2005 | Bellora et al. | ..................... | 703/8 |
| 7,222,007 B2 * | 5/2007 | Xu et al. | ......................... | 701/38 |
| 7,289,906 B2 * | 10/2007 | van der Merwe et al. | ..... | 701/214 |
| 7,865,299 B2 * | 1/2011 | Caveney | ....................... | 701/501 |
| 2003/0055563 A1 | 3/2003 | Jonas Lars et al. | | |
| 2008/0071469 A1 | 3/2008 | Caveney | | |
| 2008/0082266 A1 | 4/2008 | Bye et al. | | |
| 2008/0084283 A1 | 4/2008 | Kalik | | |

OTHER PUBLICATIONS

Wan et al., The Unscented Kalman Filter for Nonlinear Estimation, IEEE, 2000.*
Caveney, Numerical Integration for Future Vehicle Path Prediction, IEEE, Proceedings of the 2007 American Control Conference, Jul. 11-13, 2007.*
Caveney, Stochastic Path Prediction using the Unscented Transform with Numerical Integration, Proceedings of the 2007 IEEE Intelligent Transportation Systems Conference, Sep. 30-Oct. 3, 2007.*
Vehicle Speed and Wheel Angles for 55kph loop of Checkroad.
Numerical Intergration for Future Vehicle Path Prediction, Derek Caveney, New York city, Jul. 11-13, 2007, pp. (3906-3912).

(Continued)

*Primary Examiner* — Michael Fuelling
(74) *Attorney, Agent, or Firm* — Oblon, Spivak, McClelland, Maier & Neustadt, L.L.P.

(57) ABSTRACT

A method for predicting future states of a vehicle including the steps of selecting a model having n states reflecting dynamic features of the vehicle; inputting noisy sensor measurements representing a current state of the vehicle to generate (2n+1) sigma points $X_i$ where i=0, .... 2n, each of the sigma points having n states; performing (2n+1) integrations, each integration includes propagating the n-states of the respective sigma points $X_i$ through the non-linear function $Y_i=f(X_i)$; and combining the propagated sigma points to generate the predicted future states of the vehicle.

20 Claims, 12 Drawing Sheets

OTHER PUBLICATIONS

Stochastic Path Prediction using the Unscented Transform with Numerical Integration, Derek Caveney, 2007.

Nonlinear Filters: Beyond the Kalman Filter, Fred Daum, Member, IEEE Raytheon, vol. 20 No. 8 Aug. 2005, pp. (57-69).

Actual versus UT-IN Predicted Positions with 98 Percentile Ellipses for 3 sec Horizon.

Vehicle Future Trajectory Prediction with a DGPS/INS-based Positioning System, Jihua Huang, Member, IEEE, Han-Shue Tan, Minneapolis, Minnesota, USA, Jun. 14-16, 2006, pp. (5831-5836).

A New Approach for Filtering Nonlinear Systems, Simon J.Julier,et al,Robotics Research Group, department of Engineering Science, University of Oxford, OX1 3PJ UK, Proceeding of the American Control conferences, Seattle, Washington, Jun. 1995, pp. (1628-1632).

An IMM Algorithm for Tracking Maneuvering Vehicles in an adaptive Cruise Control Environment, Yong-Shik Kim,et al., International Journal of Control, Automation, and Systems, vol. 2, No. 3., pp. (310-318), Sep. 2004.

F=Const. * (1-cos(deltaHeading)) * TotalVelocity/(Relative Distance $\Lambda 2$).

Zoom-In during Curves of Actual Versus UT-IN Predicted Positions with 3 sec Horizon and 98 Percentile Ellipses.

* cited by examiner $$F = \text{const.} * (1 - \cos(\text{deltaHeading})) * \text{TotalVelocity}/(\text{Relative Distance}^{\wedge}2)$$

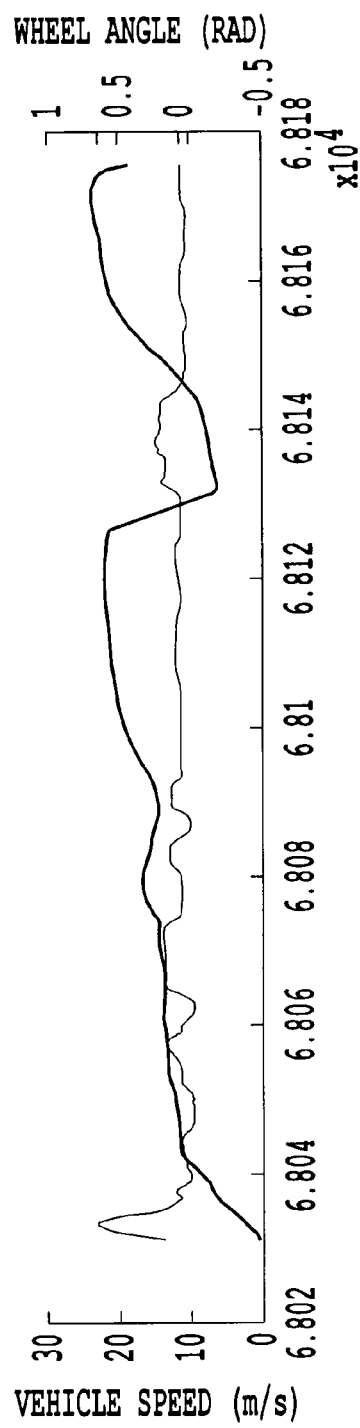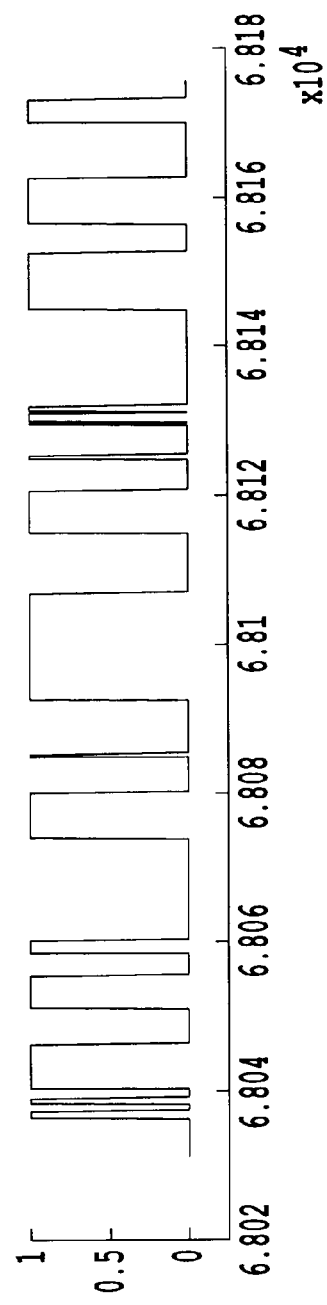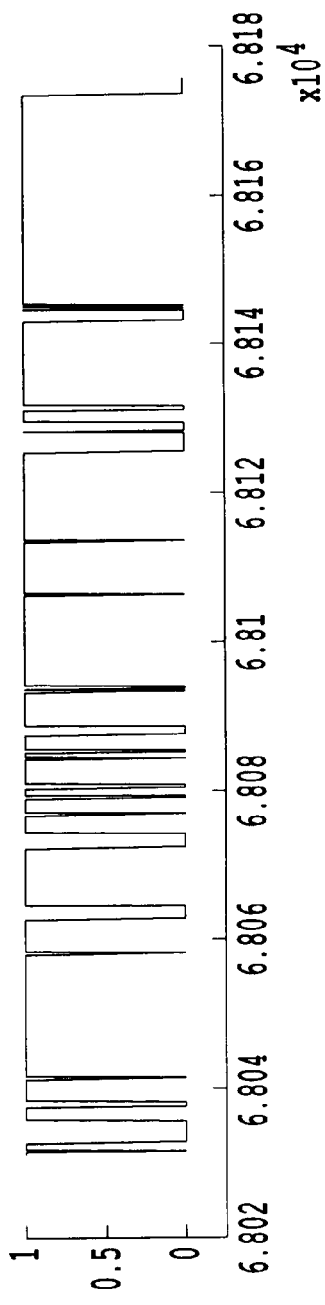
*Fig. 8D*
*Fig. 8E*
*Fig. 8F*

SYSTEM AND METHOD FOR STOCHASTICALLY PREDICTING THE FUTURE STATES OF A VEHICLE

BACKGROUND OF THE INVENTION

1. Field of the Invention

The present relates generally to a method and system for predicting a future state of a vehicle and, more particularly, to such a system utilizing the Unscented Transform (UT) and Numerical Integration (NI) together to stochastically predict the future state.

2. Description of the Related Art

Various vehicular collision detection approaches exist. Some examples include intelligent parking assist and pre-crash sensing. Production systems use radars, laser radars, cameras, or ultrasonic sensors to detect obstacles. However, the majority of these systems do not provide an assessment of another vehicle's future path of travel, but instead solely rely on the proximity of the vehicle as sensed by the sensor.

In order to predict the future position of a vehicle it is conventional to utilize a mathematical nonlinear model of the vehicle. Conventional models include the constant acceleration kinematic model (CA), the kinematic unicycle model (KU), the kinematic bicycle model (KB) or the classic bicycle model (CB). Each model consists of differential equations which, when solved, represent the dynamic action of the automotive vehicle.

Once the model has been selected, one previously utilized approach was to utilize Kalman Prediction to predict the future horizon position of the vehicle at time $T_o+T_h$ where $T_h$ equals the horizon time offset into the future from the current time $T_o$. Since all of the models are nonlinear, continuous time models, in order to apply the discrete Kalman equations, the nonlinear continuous time models must first be linearized through derivation of the Jacobian state transition matrix, $\nabla F$, and the input gain matrix, $\nabla G$. In addition, Kalman Prediction requires that a discrete time system model propagate forward through the prediction horizon $T_h$. Therefore, at each propagation step, $T_{step}$, the linearized, continuous-time system must be discretized as follows:

$$x(t) \sim \nabla F x(t) + \nabla G u(t)$$
$$\Downarrow$$
$$x[k+1] = A_d x[k] + B_d u[k]$$

where x(t) is the continuous state, x[ ] is the discretized state, $A_d$ is an n×n matrix, $B_d$ is an n×p matrix, n is the number of states, p is the number of inputs, and $A_d$ and $B_d$ are the discretized system using the sample time $T_{step}$.

While Kalman Prediction has proven sufficiently accurate in automotive systems for predicting the future position of the vehicle, Kalman Prediction is necessarily computationally intensive. Since microprocessors of the type used in automotive vehicles, for cost considerations, are not fast relative to personal computers, the computational-intensive equations required by Kalman Prediction mandate relatively long time steps $T_{step}$ between sequential equations. This, in turn, can introduce error into the predicted future position of the vehicle.

The UT is a method for calculating the statistics of a random variable which undergoes a nonlinear transformation. The intuition behind the UT is that it is easier to approximate a Gaussian distribution than it is to approximate an arbitrary nonlinear function or transformation. In contrast, the Extended Kalman Filter (EKF) approximates a nonlinear function using linearization, and this can be insufficient when the selected model has large nonlinearities over short time periods.

The UT has been applied to the Kalman-filtering problem to form the well-known Unscented Kalman Filter (UKF). This involves a simple augmentation of the state to include the noise variables. Subsequently, the process and measurement covariance matrices are included in the covariance matrix of the augmented state.

U.S. 2008/0071469, published Mar. 20, 2008 to Caveney (a co-inventor of the present invention) discloses an alternative approach to using Kalman prediction. This publication describes predicting a future position of an automotive vehicle through NI of a non-linear model. Numerical Integration for Future Vehicle Path Prediction by co-inventor Caveney also describes a method for predicting a future position of an automotive vehicle through NI of a non-linear model. The U.S. 2008/0071469 publication, specifically the NI techniques described therein, is hereby incorporated in its entirety by reference.

SUMMARY OF THE INVENTION

The inventors discovered that using NI alone to predict the future path of a vehicle is problematic because the non-linear models of vehicular dynamics are not perfect and sensor measurements are noisy. UT accounts for the uncertainty of the model and noisy sensor measurements.

Thus, it is an object of the present invention to use UT and NI together to stochastically predict the future states of the vehicle (e.g., the vehicle's position, orientation, velocity, yaw-rate, and acceleration). This invention allows for the prediction routine to maintain nonlinear models and, consequently, provide more accurate predictions. That the mean of the prediction obtained using UT and NI together was more accurate than obtained by NI alone was unexpected. Furthermore, the invention has been shown to be computationally faster than prior prediction methods.

It is another object of the present invention to predict the future states of a vehicle onboard the vehicle or using roadside hardware.

It is a further object of the present invention to implement the prediction methodology in collision detection and avoidance systems.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8A-8F illustrate a comparative analysis of UT-NI to Kalman's methods for predicting the future states of a vehicle.

DETAILED DESCRIPTION OF THE PREFERRED EMBODIMENTS

Figure 1:
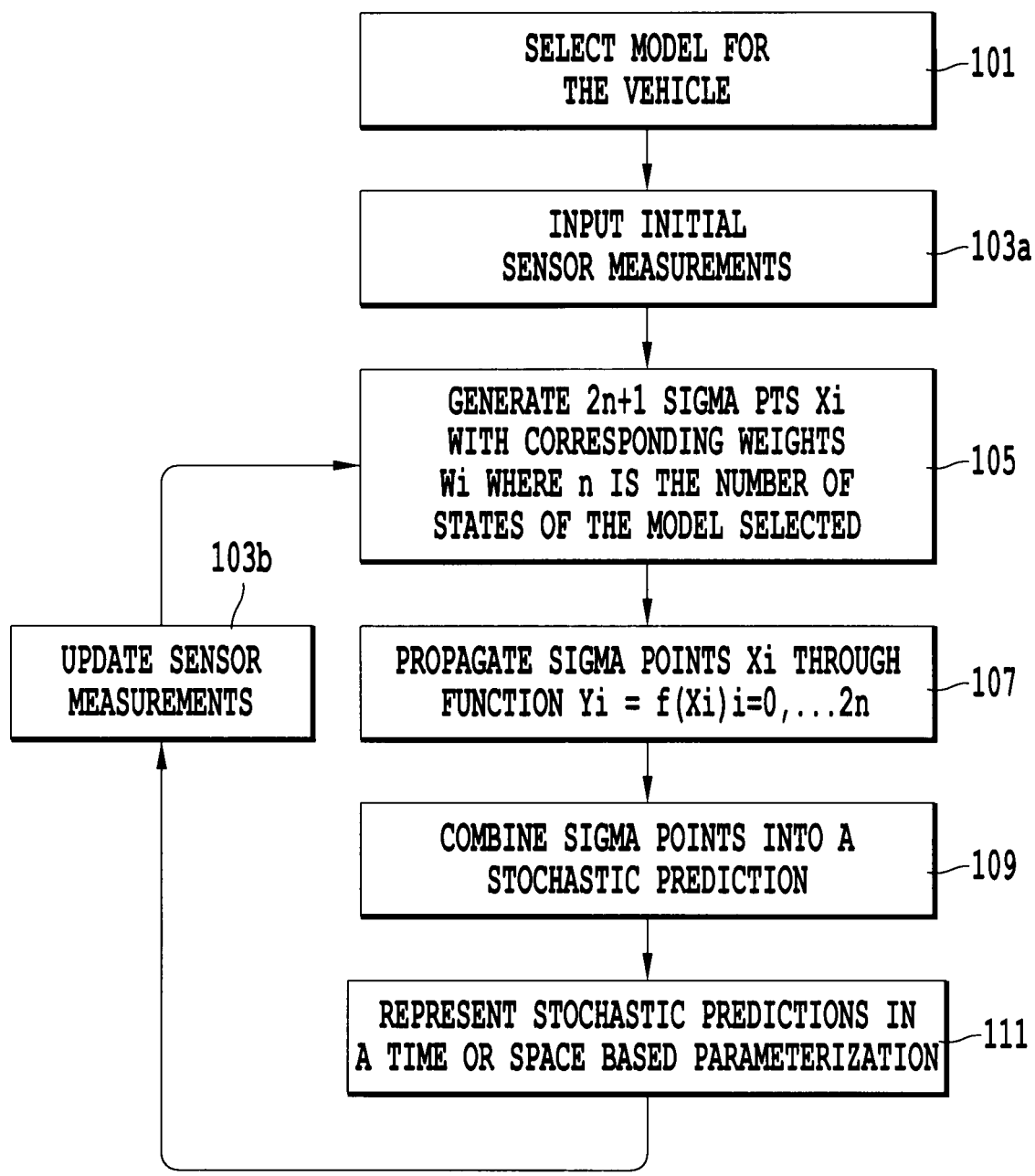
FIG. 1 is a flow chart illustrating the UT-NI processing according to the present invention.

Referring now to the drawings, wherein like reference numerals designate identical or corresponding parts throughout the several views. FIG. 1 is a flow chart illustrating the processing steps for predicting the future states of a vehicle. Description herein will be directed to an automobile. However, this invention is applicable to other moving objects which are suitable for non-linear modeling.

In step 101, a non-linear model for the vehicle is chosen. Many vehicle-level models exist. The transformation between the vehicle coordinate frame and the earth coordinate frame implies that all models will at least include some trigonometric nonlinearities. Any model that involves yaw and lateral motion of the vehicle will introduce further non-linear behavior.

The model described herein is the CB model. However, other dynamic models which can be utilized include the CA, KU, and KB models. Each model consists of differential equations which, when solved, represent the dynamic action of the vehicle. The CB model includes as vehicle parameters the mass M, yaw inertia JZ, and the perpendicular distances from the front and rear axles to the vehicles center of gravity, a and b, respectively. Thus a+b is the wheelbase of the vehicle. The equations are, $$\dot{x}_{CB} = \begin{bmatrix} \dot{x} \\ \dot{y} \\ \dot{\psi} \\ \dot{v}_x \\ \dot{v}_y \\ \dot{\omega} \end{bmatrix} = \begin{bmatrix} v_x\cos(\psi) - v_y\sin(\psi) \\ v_x\sin(\psi) + v_y\cos(\psi) \\ w \\ a_x[0] \\ f_1(v_x, v_y, \omega, dw[0]) \\ f_2(v_x, v_y, w, dw[0]) \end{bmatrix}$$

with $$f_1(v_x, v_y, w, dw) = \frac{-2(C_{af} + C_{ar})v_y}{Mv_x} + \left(\frac{-2(C_{af}a - C_{ar}b)}{Mv_x} - v_x\right)w + \left(\frac{2C_{af}}{M}\right)dw \text{ and}$$

$$f_2(v_2, v_y, w, dw) = \frac{-2(C_{af}a - C_{ar}b)v_y}{J_z v_x} + \left(\frac{-2(C_{af}a^2 + C_{ar}b^2)}{J_z v_x}\right)w + \left(\frac{2C_{af}a}{J_z}\right)dw$$

where $C_{af}$ and $C_{ar}$, are the front and rear tire cornering stiffnesses, respectively. The states x, y, and $\Psi$ are with respect to the earth-fixed coordinate frame and $v_x$, $v_y$, and $a_x$ are with respect to the vehicle-fixed coordinate frame. x is the longitude with positive East, y is latitude with positive North, and $\Psi$ is the vehicle heading positive counterclockwise from the x axis. VX is the longitudinal velocity of the vehicle, and $v_y$ is the lateral velocity. $\omega$ is the yaw-rate of the vehicle. The inputs to the model are the vehicle longitudinal acceleration $a_x$ and the front-wheel angle, $d_w$ and are assumed constant over the prediction horizon. All state values at the initial time of each prediction (i.e., t=0) are available from direct vehicle or Differential Global Positioning System (DGPS) measurements.

The CB model contains a small set of vehicle parameters and differential equations, while still capturing a large part of the vehicle-level dynamics. Note that this model does not include tire deformation or tire caster effects. Only a linear relationship between cornering stiffness and lateral wheel force is incorporated in the CB model.

Figure 2A:
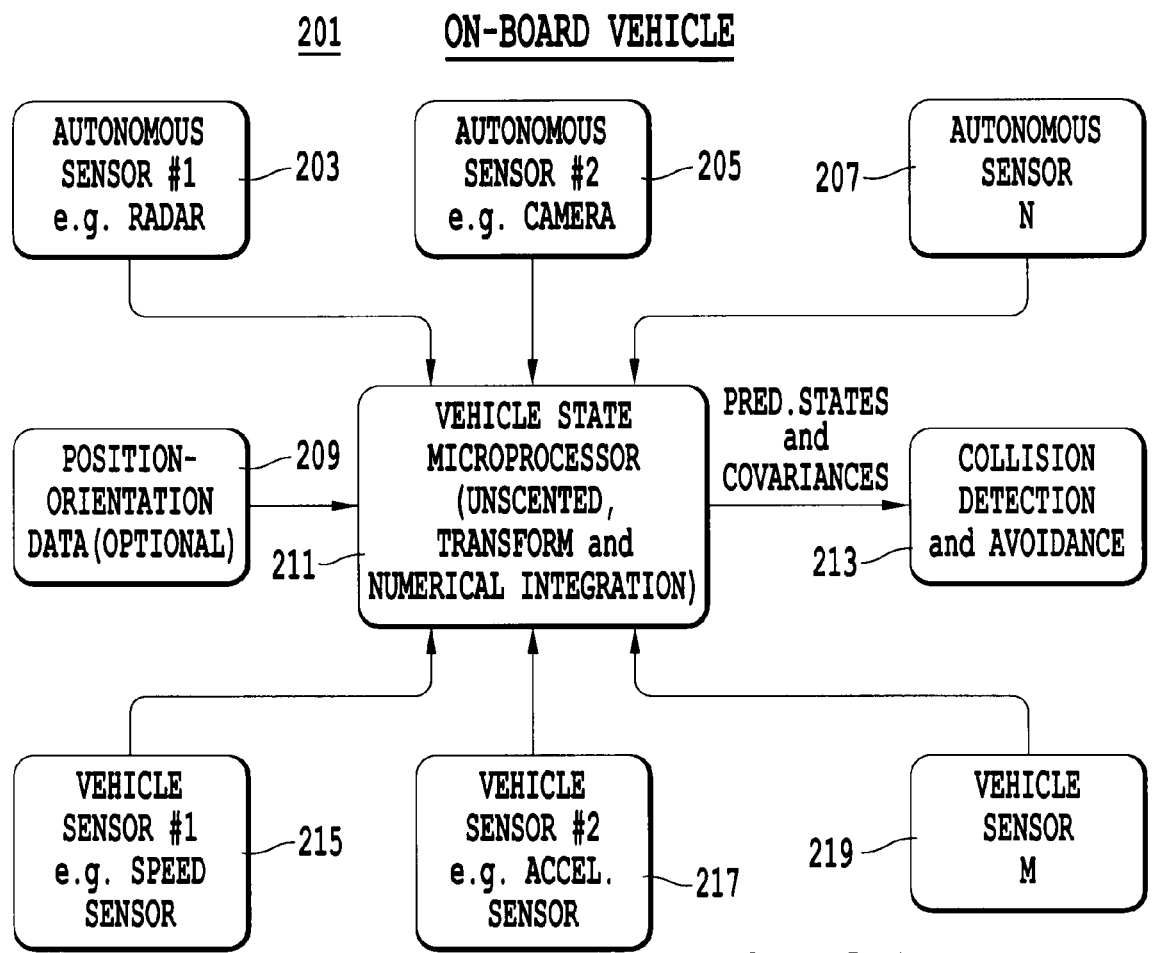
FIG. 2A is a block diagrammatic view of an on-board vehicle state prediction system according to a first embodiment of the present invention.

FIG. 2 illustrates a simplified block diagram of an embodiment of a vehicle state prediction system 201. The system includes a microprocessor 211. The microprocessor receives inputs from two sets of sensors. The input information is usually available over a vehicle communication bus. Sensors (1 to m) 215, 217, and 219 are provided on the vehicle and include for example a speed sensor, an acceleration sensor, and a steering wheel angle sensor. Sensors (1 to n) 203, 205, and 207 are autonomous sensors provided on the vehicle to sense other vehicles and include for example a radar, a laser radar, a camera, and an ultrasonic sensor. A Global Positioning System (GPS) and/or an inertial positioning system can be used to provide position and orientation data 209 of the vehicle. The prediction methodology of the present invention can be employed without the position and orientation data 209.

In step 103a, measurements from sensors 209, 215, 217, and 219 are input to the microprocessor 211. The measurements are noisy (uncertain). Updated sensor measurements are obtained every 100 milliseconds, for example. See step 103b. The present invention accounts for the uncertainty of the measurements as disclosed below. See also Stochastic Path Prediction using the Unscented Transform with Numerical Integration, by co-inventor Caveney.

In step 105, an n-dimensional random variable x with mean $\bar{x}$ and covariance $P_x$ is propagated through a nonlinear function y=f(x). To calculate the statistics of y, the UT generates 2n+1 deterministic points (known as sigma points) $X_i$ with corresponding weights $W_i$. The sigma points are defined as:

$$x_0 = \bar{x}$$

$$x_i = \bar{x} + (\sqrt{(n+\lambda)P_x})_i \; i=1,\ldots,n$$

$$x_i = \bar{x} - (\sqrt{(n+\lambda)P_x})_{i-n} \; i=n+1,\ldots,2n$$

where $(\sqrt{(n+\lambda)P_x})_i$ is the ith row (or column) of the matrix square root. These sigma points are propagated through nonlinear function, $$y_i = f(x_i) \; i=0,\ldots,2n.$$

See step 107 of FIG. 1.

According to an embodiment of the present invention, when combining NI and UT for path prediction, the propagation through the nonlinear function will be performed by the Runge Kutta-Fehlburg (RKF) equations. Also known as the Embedded Runge-Kutta formulas, this adaptive step-size method is attractive because it allows fifth order accuracy with only six function evaluations. However, other NI techniques including the classical fourth-order Runge-Kutta equations can be utilized.

For the six-state classic bicycle model, the propagation will require 2(6)+1=13 integrations. In step 109, the propagated sigma points are combined into a stochastic prediction. The stochastic prediction is represented in a time or spaced based parameterization in step 111. The mean, $\bar{y}$, and covariance, $P_y$ of y are approximated by a weighted sample mean and covariance of the propagated sigma points, $Y_i$, $$\bar{y} \approx \sum_{i=0}^{2n} W_i^{(m)} y_i$$

$$P_y \approx \sum_{i=0}^{2n} W_i^{(c)} (y_i - \bar{y})(y_i - \bar{y})^T$$

Where the weights are defined by $$W_o^{(m)} = \frac{\lambda}{n+\lambda}$$

$$W_o^{(c)} = \frac{\lambda}{n+\lambda} + (1 - \alpha^2 + \beta)$$

$$W_i^{(m)} = W_L^{(c)} = \frac{1}{2(n+\lambda)}.$$

Here $\lambda = \alpha^2 (n+k) - n$ is a scaling $\alpha$ parameter. $\alpha$ determines the spread of the sigma points around $\bar{x}$ and is typically set to 1e−3. $\kappa$ is a secondary scaling parameter which is usually set to 0, and $\beta$ is used to incorporate prior knowledge of the distribution of $\bar{x}$ (for Gaussian distributions, a value of 2 for $\beta$ is optimal).

As discussed above, the UT has been applied to the Kalman-filtering problem to form the well-known UKF. This involves a simple augmentation of the state to include the noise variables. Subsequently, the process and measurement covariance matrices are included in the covariance matrix of the augmented state. However, in the present invention, predictions are only performed where there is no measurement update or process noise, so the UT is only applied to the stochastic state, x. By combining NI with UT, both a better estimate and associated covariance can be obtained.

Figure 2B:
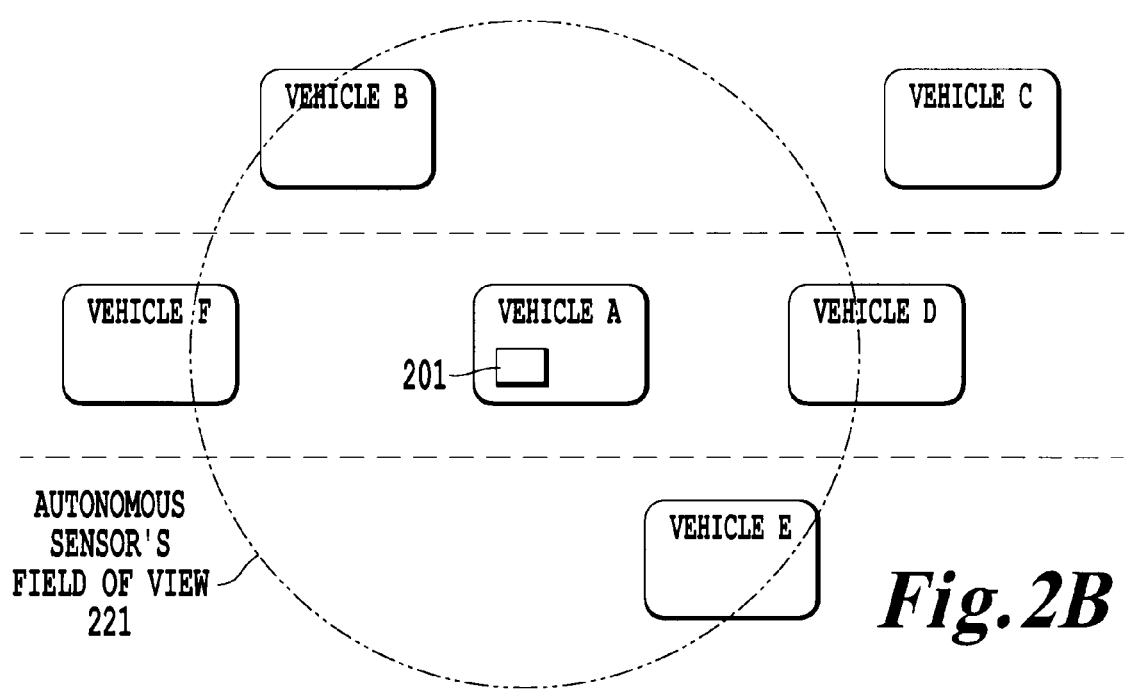
FIG. 2B illustrates the field of view of the on-board vehicle state prediction system illustrated in FIG. 2A.

As illustrated in FIG. 2B, the autonomous sensors 203, 205, and 207 have a field of view 221 which enable Vehicle A to sense and predict the future states of other vehicles. The field of view 221 is depicted for simplicities sake in FIG. 2B as being circular. However, each of the autonomous sensors will have different fields of view.

As depicted in FIG. 2B, Vehicle A is able to sense Vehicles B, D, E, and F. However, Vehicle C is not within the sensors field of view 221. In addition to predicting its own future states using sensors 209, 215, 217, and 219, Vehicle A is able to predict the future states of Vehicles B, D, E, and F using the output of autonomous sensors 203, 205, and 207 as the inputs for the initial sensor measurements, step 103a, and updated sensor measurements, step 103b, discussed with regard to FIG. 1.

The vehicle state microprocessor 211 outputs the predicted future states of Vehicles A, B, D, E, and F to collision detection and avoidance microprocessor 213. The microprocessors 211 and 213 utilize a computer readable storage medium, such as a memory (e.g., ROM, EPROM, EEPROM, flash memory, static memory, DRAM, SDRAM, and their equivalents), configured to control the microprocessors to perform the methods of the present invention. The microprocessors, in an alternate embodiment, further include or exclusively include a logic device for augmenting or fully implementing the present invention. Such a logic device includes, but is not limited to, an application-specific integrated circuit (ASIC), a field programmable gate array (FPGA), a generic-array of logic (GAL), and their equivalents. The microprocessors 211 and 213 can be separate devices or a single processing mechanism.

Figure 3A:
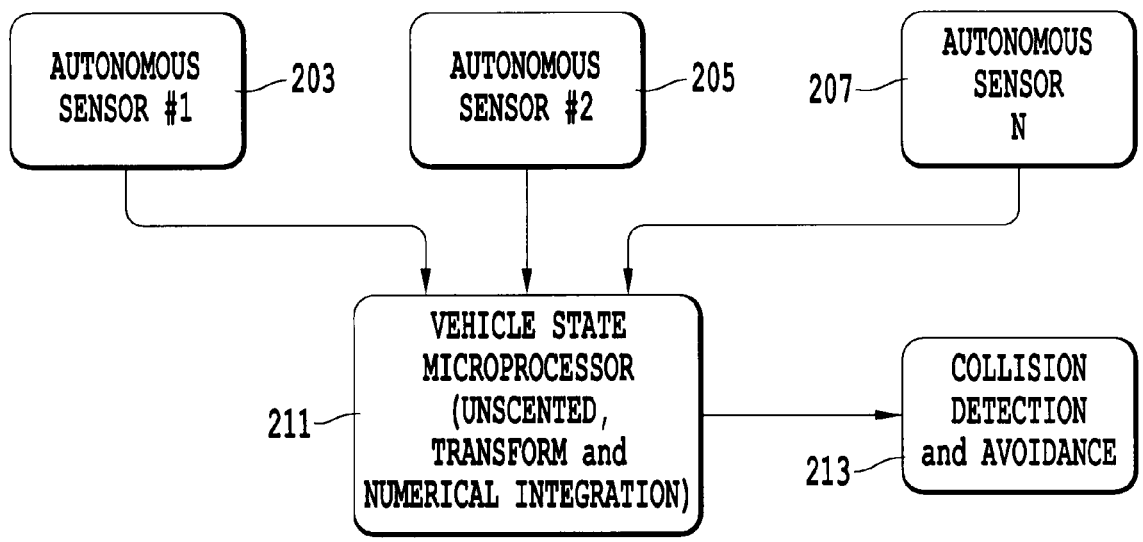
FIG. 3A is a block diagrammatic view of a roadside vehicle state prediction system according to an embodiment of the present invention.
Figure 3B:
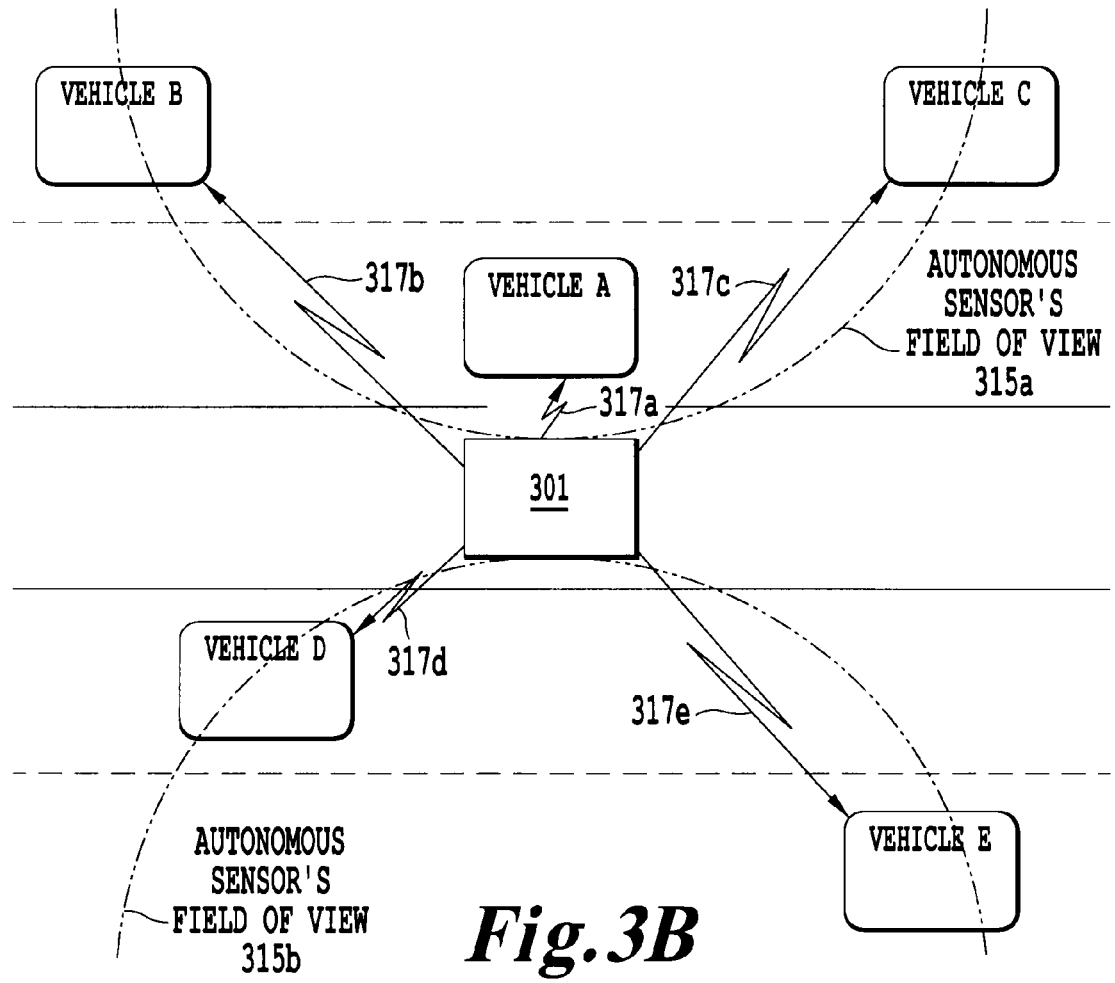
FIG. 3B illustrates the field of view of the roadside vehicle state prediction system illustrated in FIG. 3A.

In an alternative embodiment illustrated in FIGS. 3A and 3B, the sensors 203, 205, 207, and microprocessors 211 and 213 are used in a roadside system 301. Similar to the field of view 221 illustrated in FIG. 2B, the sensors 203, 205, and 207 used in a roadside system create a field of view for sensing vehicles. As reflected in FIG. 3B, the roadside system can be strategically placed between highway traffic to monitor more than one direction of traffic. Here, two fields of view 315a and 315b are illustrated. Other locations for the roadside system 3A could include intersections, overpasses, and the like.

The microprocessor 211 uses the output of sensors 203, 205, and 207 to predict the future states of Vehicles A, B, C, D, E, and F. The stochasticly predicted states are communicated to microprocessor 213 for collision detection and avoidance processing. If a collision is detected, then the roadside system 301 communicates to the vehicles involved calculated avoidance measures. The communications 317a, 317b, 317c, 317d, and 317e are unidirectional wireless communications in this embodiment. Supplemental or in lieu of the unidirectional wireless communications, road signs could be used to communicate predicted collisions.

Figure 4A:
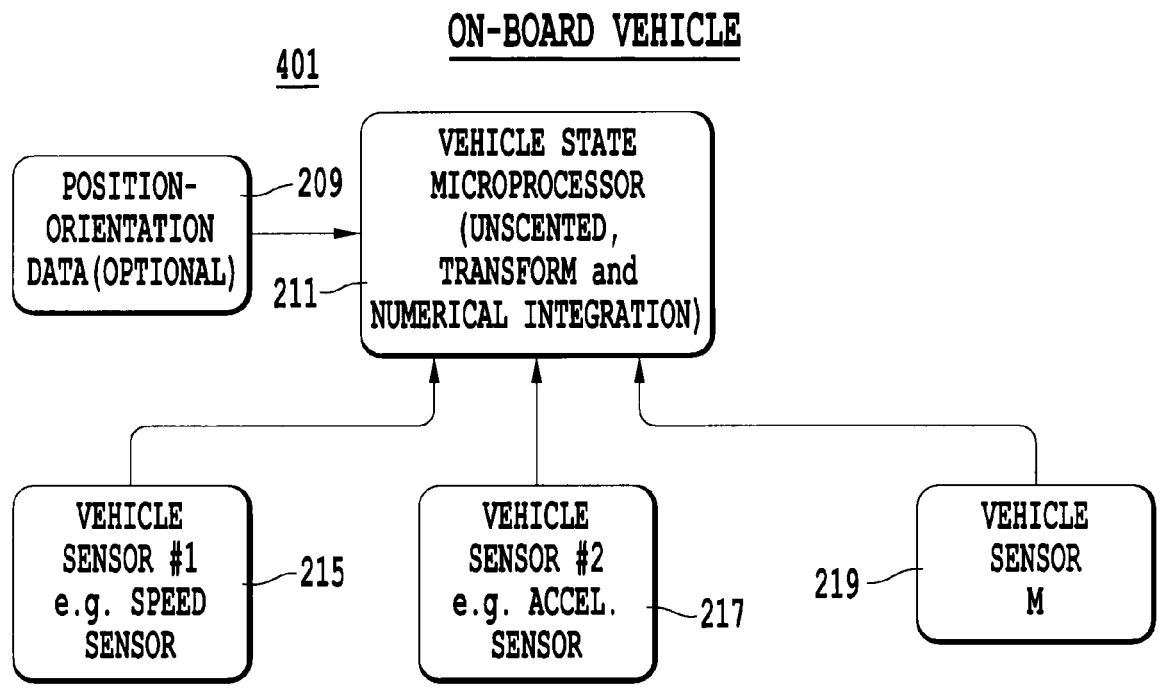
FIG. 4A is a block diagrammatic view of an on-board vehicle state prediction system according to a second embodiment of the present invention.
Figure 4B:
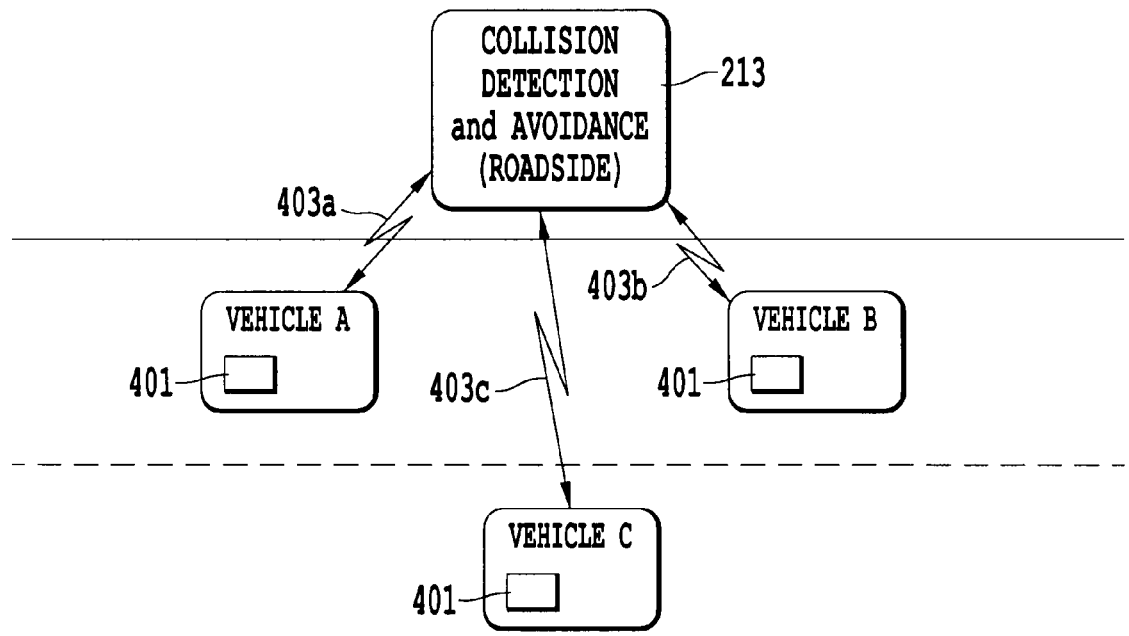
FIG. 4B illustrates communications between a roadside collision detection and avoidance system and vehicles having the on-board vehicle state prediction system illustrated in FIG. 4A.

In another embodiment illustrated in FIGS. 4A and 4B, the sensors 209, 215, 217, 219, and microprocessor 211 are used in an onboard system 401 provided in Vehicles A, B, and C. Microprocessor 213 is provided in a roadside system.

Each Vehicle A, B, and C stochastically predicts its own future states and then shares its predictions with the roadside system through bi-directional wireless communications 403a, 403b, and 403c. Collision detection and avoidance is computed by the roadside system processor 213 and the results shared with the Vehicles A, B, and C through the wireless communications.

Figure 5A:
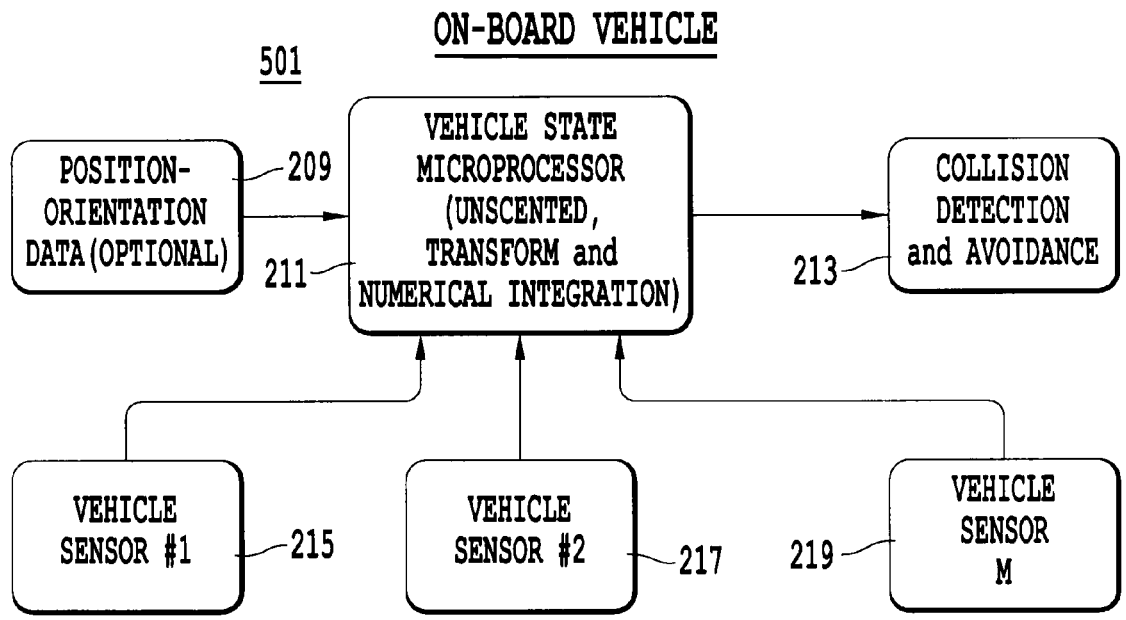
FIG. 5A is a block diagrammatic view of an on-board vehicle state prediction system according to a third embodiment of the present invention.
Figure 5B:
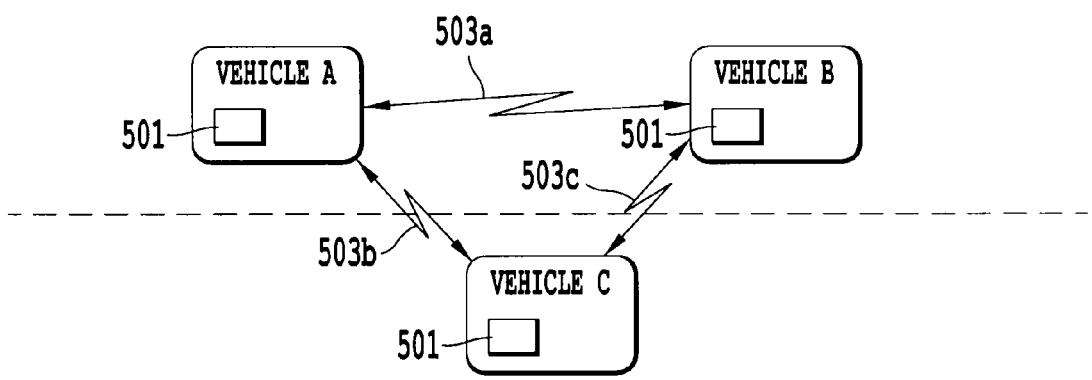
FIG. 5B illustrates communications between vehicles having the on-board vehicle state prediction system illustrated in FIG. 5A.

In another embodiment illustrated in FIGS. 5A and 5B, the sensors 209, 215, 217, 219, and microprocessors 211 and 213 are used in an onboard system 501 provided in each of Vehicles A, B, and C.

Each Vehicle A, B, and C stochastically predicts its own future states and then shares its predictions with the other vehicles through bi-directional wireless communications 503a, 503b, and 503c. Collision detection and avoidance is computed on board each vehicle using microprocessors 213.

Thus, it can be seen that the embodiments illustrated in FIGS. 2 and 5 require no roadside infrastructure. The FIG. 2 embodiment requires no wireless communications. Combinations of the embodiments illustrated in FIG. 2 or 3 with embodiments illustrated in FIG. 4 or 5 can be realized whereby a vehicle that has no communication capability has its state prediction computed by infrastructure or vehicles with autonomous sensing capabilities, and then the prediction is shared with other vehicles through wireless communications.

Methodologies other than the UT-NI stochastic prediction methods of the present invention can be used in the embodiments illustrated by FIGS. 2-5. Further, it should be noted that with wireless communications, the collision detection and avoidance processing is applicable to vehicles that are traveling at higher speeds and higher relative distances than is possible with autonomous sensing alone. Two benefits of wireless communications are the allowable range and field of view to detect a collision before it occurs.

Figure 6:
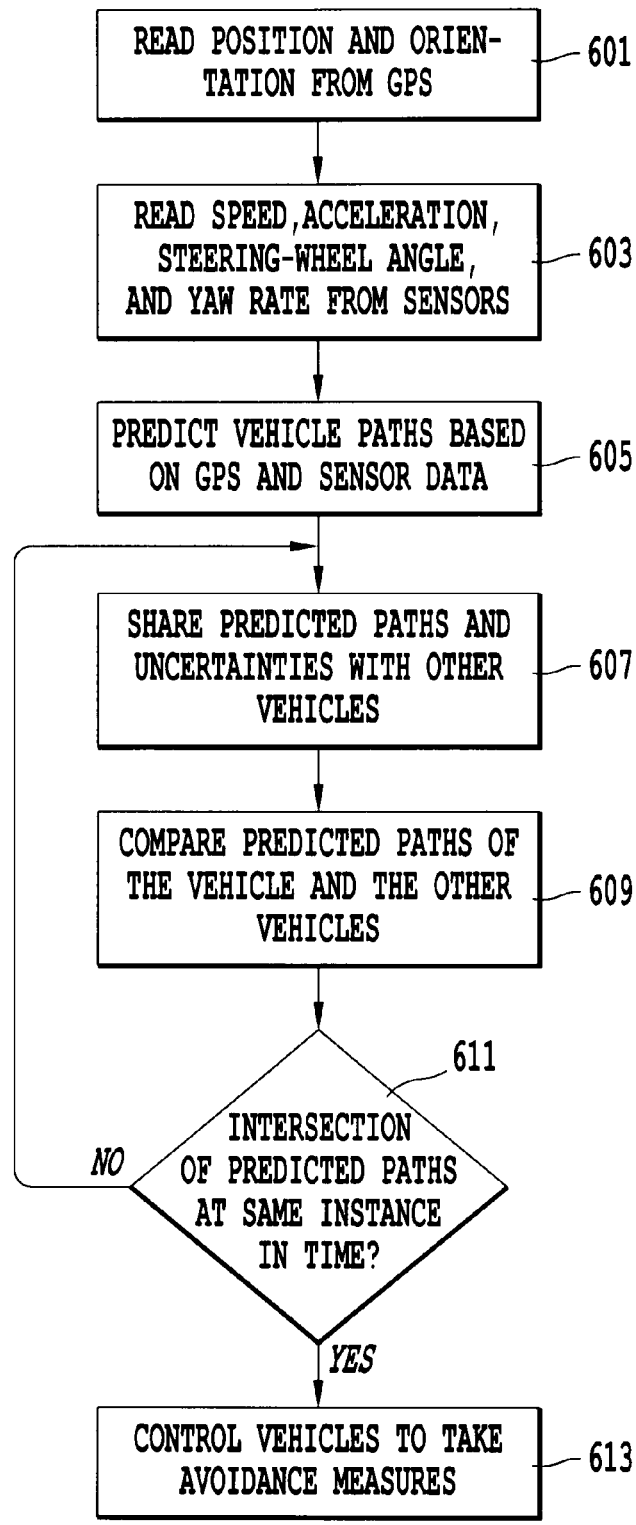
FIG. 6 is a flow chart illustrating collision detection and avoidance processing according to the present invention.

FIG. 6 is a flow chart illustrating a collision detection and avoidance processing methodology used for the embodiment of FIG. 5. Similar variants are employed for the embodiments of FIGS. 2-4. In steps 601, 603, and 605, the future states of the vehicle are predicted. In step 607, the predicted states and uncertainties (if determined) of the vehicle are shared with other vehicles. In step 609, the predicted paths of the vehicle and the other vehicles are compared.

In step 611, if the comparison reveals intersecting paths at the same instance in time, then in step 613 that information is used by each involved vehicle to take avoidance measures. If the comparison does not reveal an intersecting path, then the processing loops back to step 607 where predicted paths of the vehicle are shared. It should be noted that different time scales can exist for the different step processes illustrated in FIG. 6.

Figure 7A:
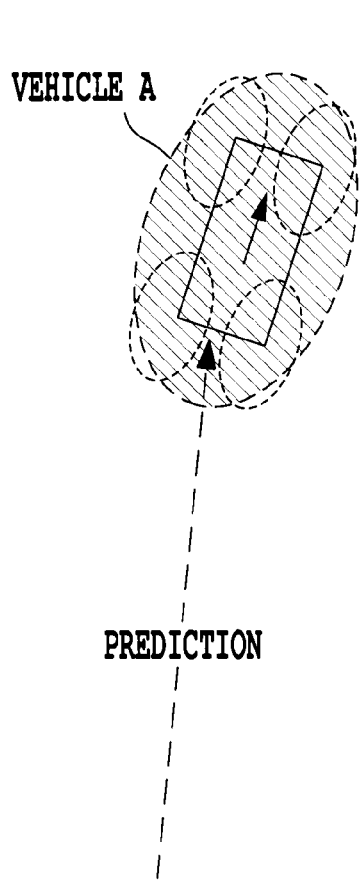
FIGS. 7A-7E diagrammatically illustrate a process for allocating responsive measures to avoid a collision.

FIGS. 7A-7E diagrammatically illustrate a process for allocating responsive measures to avoid a collision involving a plurality of vehicles. In FIG. 7A, the predicted future state of a Vehicle A is illustrated. The current state of the vehicle is depicted as a rectangle. The predicted future state of the Vehicle A is depicted as a 98 percentile prediction ellipse in which 98 percent of the X-squared probability distribution of each 2-dimensional predicted position lies. The arrow within the vehicle depicts the net vector sum force of the vehicle.

Figure 7B:
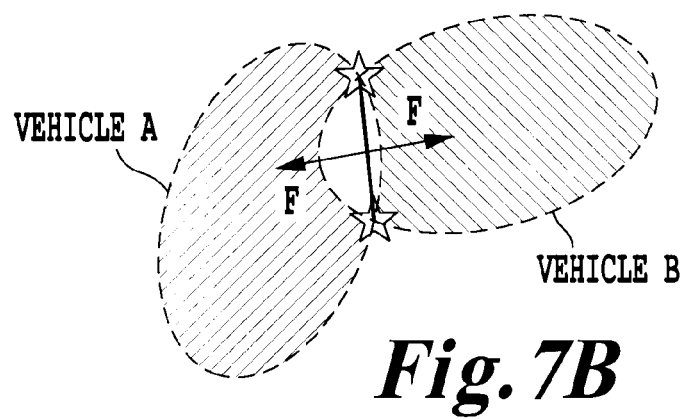

FIG. 7B illustrates the predicted collision of Vehicle A and a Vehicle B. In order to calculate the net vector sum force F needed to be implemented by each of the vehicles to avoid a collision, in the present invention, the first step includes determining the overlap of the ellipses. In one embodiment, this process includes connecting the two intersection points of the overlapping ellipses. Then, the force F is calculated as follows: F=(const.*(1−cos(deltaHeading))*TotalVelocity)/(Relative Distance)$^2$. F reflects the responsive force needed by each vehicle to repulse the two ellipses from each other. The greater the selected "const.", the larger the calculated F. Thus, for example, if the "const." is set high, then greater responsive braking will be applied by Vehicle B.

Figure 7C:
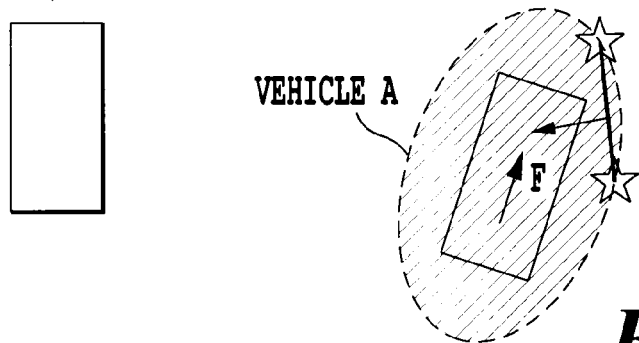

FIG. 7C illustrates Vehicle A in isolation. Two arrows are illustrated: (i) the predicted orientation of the vehicle and (ii) the calculated responsive net vector force F needed to be allocated by Vehicle A to avoid the collision. In the case of Vehicle A, a net vector sum force substantially 90 degrees counter clockwise to the projected orientation of the vehicle is needed to avoid the collision. As can be seen from FIG. 7B, a net vector sum force substantially 180 degrees relative to the projected orientation of Vehicle B should be allocated to Vehicle B to avoid the collision.

Figure 7D:
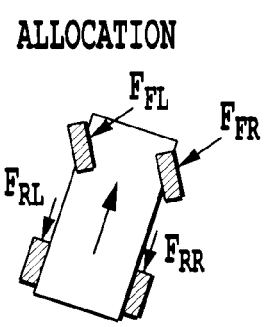
Figure 7E:
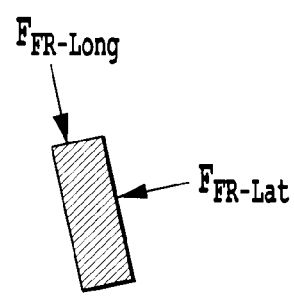

FIG. 7D identifies the responsive forces available to Vehicle A to implement the net vector sum force needed to avoid the collision. The allocation is platform dependent. For example, if the vehicle is all-wheel drive, then acceleration of all four wheels is available. However, if the vehicle is rear wheel drive, then acceleration of only the rear wheels is available. As reflected in FIG. 7D, only the front wheels of Vehicle A can be allocated a responsive force to orient the vehicle substantially 90 degrees counter clockwise to the predicted orientation of the vehicle. See FIG. 7E which reflects that each of the front wheels can be allocated a lateral and longitudinal responsive force F to orient the Vehicle A as needed.

Figure 7F:
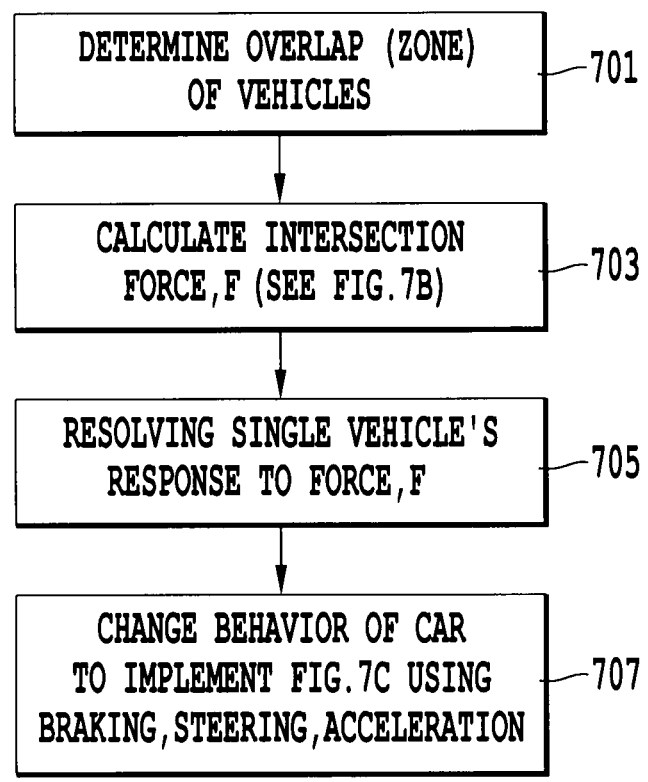
FIG. 7F is a flow chart illustrating the process for allocating responsive measures to avoid a collision.

FIG. 7F is a flow chart illustrating the process for allocating responsive measures to avoid a collision. This process can be implemented on-board the vehicle or using roadside processing infrastructure. In step 701, the predicted overlap (zone) of the vehicles is determined. In step 703, the intersecting force, F, of the vehicles is calculated. In step 705, the single vehicle response to the force calculated in step 703 is resolved. In step 707, the behavior of the single vehicle is changed via braking, steering, and/or acceleration to avoid the collision.

COMPARATIVE ANALYSIS

The comparative analysis provided below was performed using real-world data collected on a 2006 Toyota Prius equipped with a DGPS (using WAAS corrections), a longitudinal accelerometer, a yaw-rate gyro, wheel-speed sensors that are averaged for a vehicle-speed estimate, and a steering-wheel-angle sensor. All sensors besides the DGPS were from the production vehicle. For consistency, no additional filtering, besides that done by the sensors and ECUs themselves was performed on the data collected off the vehicle's communication bus. This included the use of the noisy automotive-grade longitudinal accelerometer over numerically differentiated wheel speeds. The steering wheel angle was proportionally related to the front wheel angles by a constant 19.1:1 ratio. Cornering-stiffness values were found empirically while driving on dry asphalt road surfaces.

A. Prediction Accuracy

When linearizing the CB model for Kalman Prediction, it can be linearized once, using the prediction horizon $T_h$, or it can be re-linearized M times over the prediction horizon. Note that for the comparison discussed below, M is chosen to equal the average number of numerical integration timesteps for each of the horizon. Looking at the overall average number of integration timesteps for all five different prediction horizons, M equals approximately 5 times the prediction horizon (i.e., for a 3 sec. prediction horizon, an average of 15 integration steps are required). Thus, a sampling time T of 0.2 sec. was used for Kalman Prediction.

The Earth Coordinate Frame is based on the Universal Transverse Mercator (UTM) System grid. It is a decimal, rectangular grid to which spherical degree measurements from GPS signals can be converted using various reference ellipsoids. In this comparison, the WGS-84 reference ellipsoid was used. Cartesian UTM positions (x, y) are in meters.

Figure 8A:
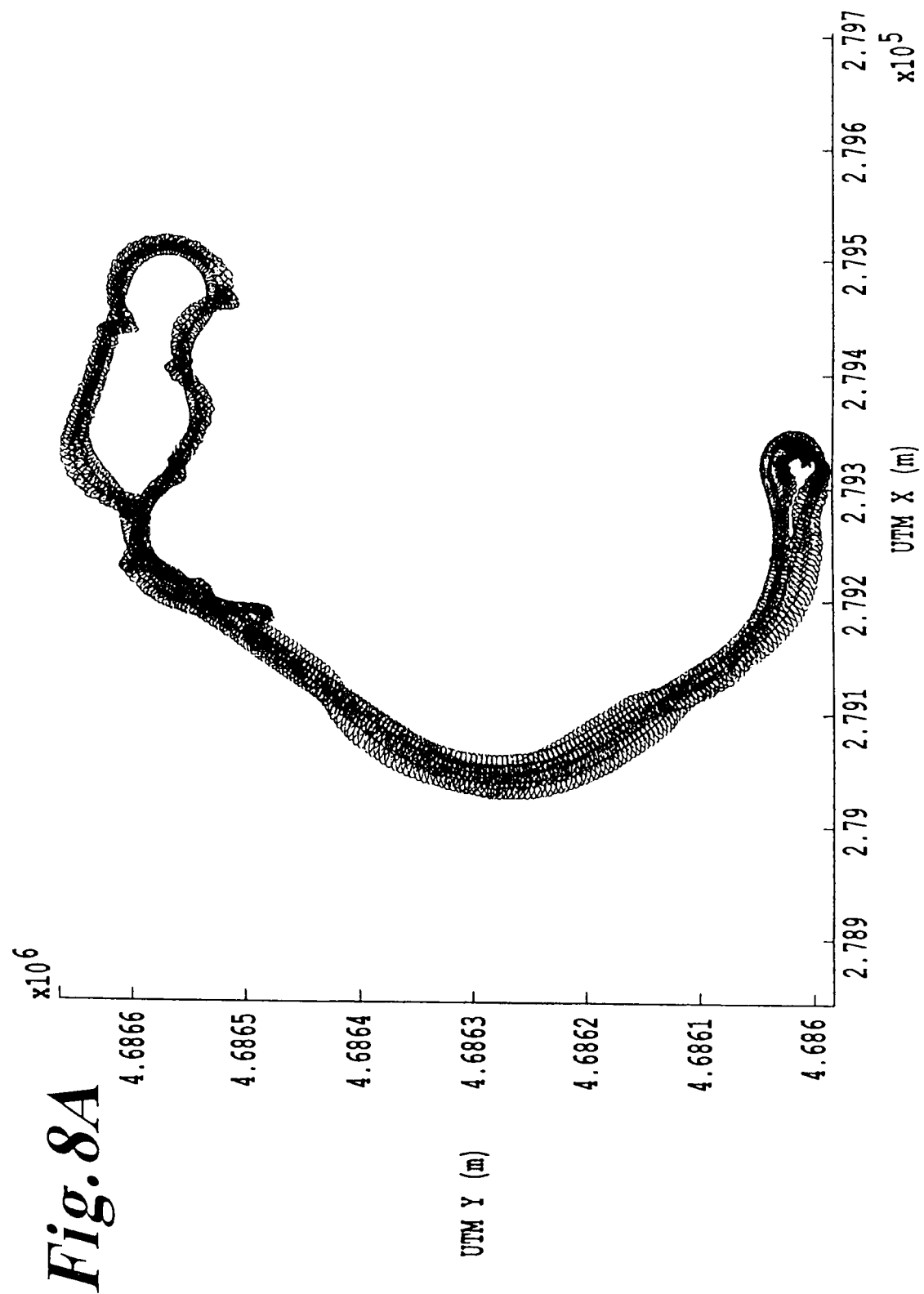
Figure 8B:
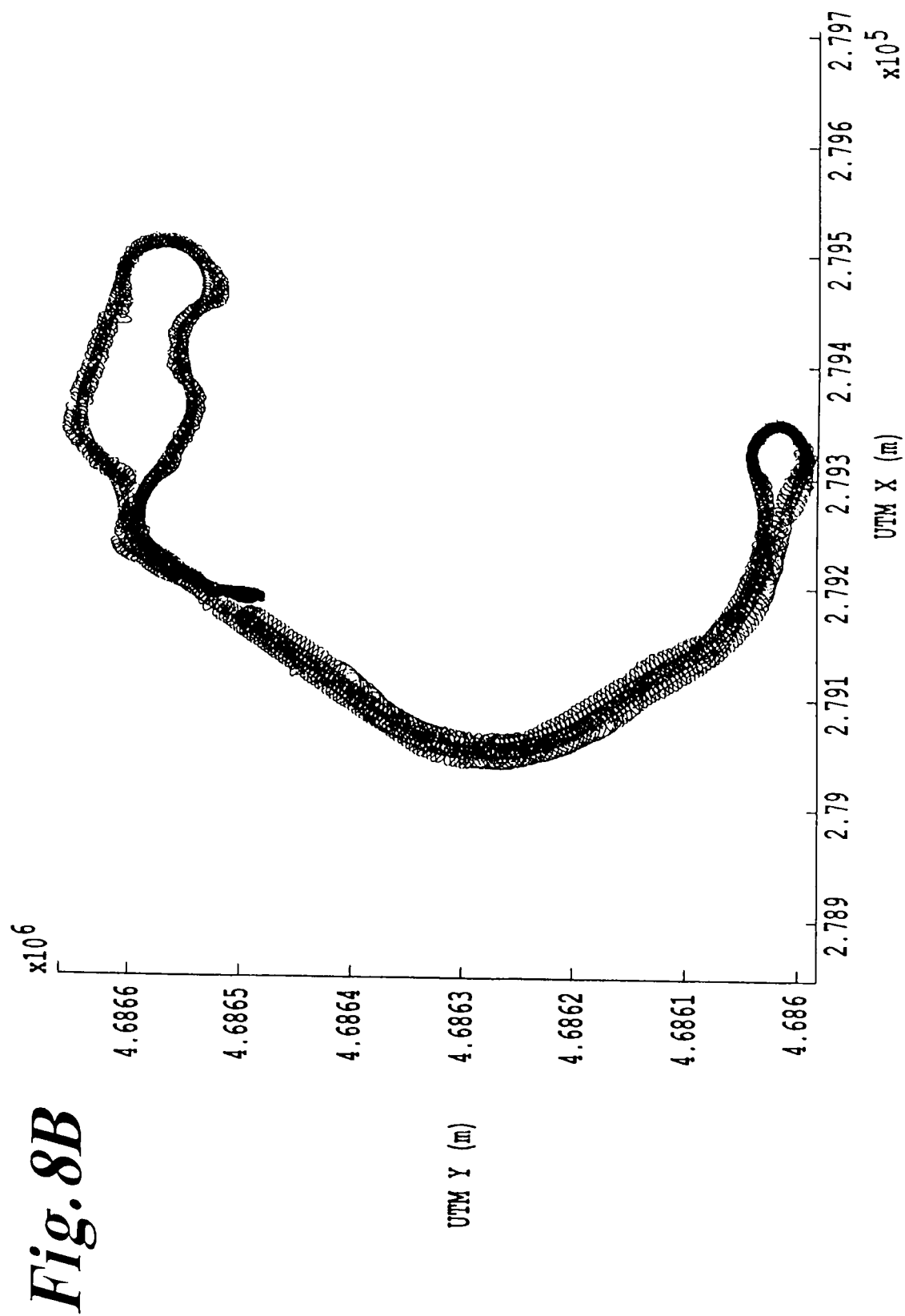
Figure 8C:
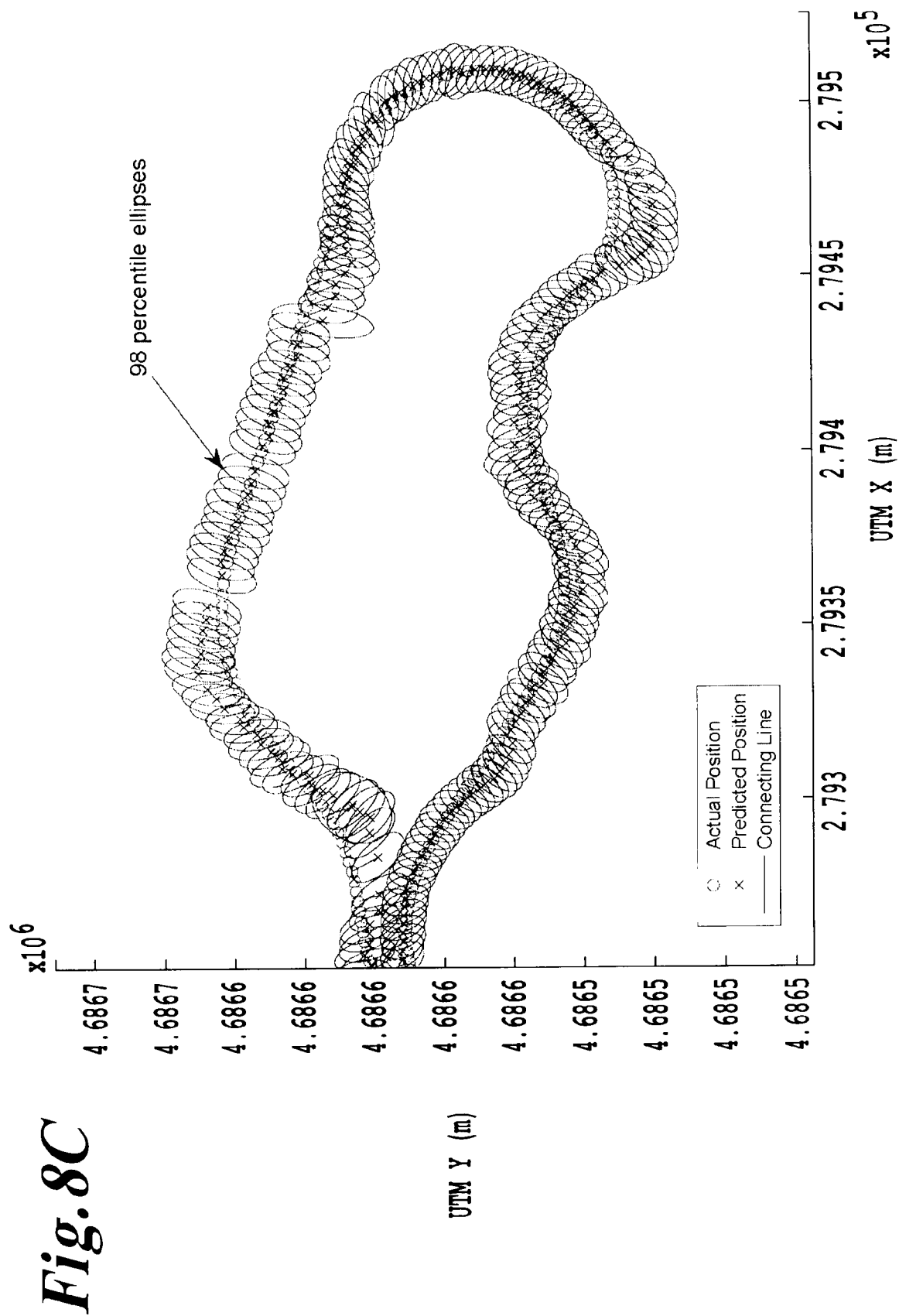

The data was collected from a checkroad at the Toyota Technical Center in Ann Arbor, Mich. As illustrated in FIG. 8A, the checkroad allows for a variety of driving conditions, from straight-aways to curvy handling sections. This first plot shows the predicted positions using Kalman-Prediction equations of the linearized CB model for a 3 sec. horizon around the track at moderate city speeds (averaging 55 kph) on dry roads. Also drawn on this plot are the 98 percentile prediction ellipses, in which 98 percent of the X-squared probability distribution of each 2-dimensional predicted UTM position lies. For comparison, the second plot (FIG. 8B) shows the predicted position and ellipses using the unscented transform with numerical integration (UT-NI) of the CB model for the same data set. The superiority of the UT-NI approach is immediately evident.

Table I provides the Root Mean Square (RMS) prediction accuracy for different loops around the checkroad at different speeds. The superiority of the UT-NI approach is particularly apparent during long prediction horizons and high vehicle speeds. It is interesting to note that means of the prediction position using the UT-NI approach are more accurate than the results provided by the NI approach alone, where the nonlinear CB model is simply integrated ahead using the (deterministic) initial condition.

TABLE I

RMS POSITION ACCURACY (IN METERS) COMPARISON FOR THE TWO APPROACHES AND DIFFERENT AVERAGE VEHICLE SPEED

| | | Prediction Horizon (seconds) | | | | |
|---|---|---|---|---|---|---|
| Approach | Speed | 1 sec | 2 sec | 3 sec | 4 sec | 5 sec |
| Kalman | 45 kph | 0.42 | 1.29 | 3.79 | 8.72 | 15.9 |
| | 55 kph | 1.01 | 3.32 | 7.88 | 16.1 | 27.9 |
| | 67 kph | 1.49 | 4.87 | 11.4 | 23.0 | 40.0 |
| UT-NI | 45 kph | 0.21 | 1.25 | 1.91 | 3.72 | 6.07 |
| | 55 kph | 0.32 | 1.29 | 3.29 | 5.93 | 8.57 |
| | 67 kph | 0.44 | 1.52 | 4.51 | 7.80 | 9.96 |

The checkroad in Ann Arbor receives good GPS satellite visibility. With the WAAS differential beacon correction, the absolute position accuracy of the DGPS unit is roughly 1 m. However, the prediction accuracy is a function of relative accuracy, thus the values in Table I can fall below 1 m.

The superior prediction capabilities of the UT-NI approach are further illustrated in Table II, where the percentage of actual positions which fell within the 98 percentile ellipse of their predicted positions is given. Again this is shown for three different speeds.

TABLE II

PERCENTAGE OF ACTUAL POSITIONS CONTAINED WITHIN 98 PERCENTILE ELLIPSE OF THE PREDICTED POSITIONS

| | | Prediction Horizon (seconds) | | | | |
|---|---|---|---|---|---|---|
| Approach | Speed | 1 sec | 2 sec | 3 sec | 4 sec | 5 sec |
| Kalman | 45 kph | 100 | 98.8 | 85.0 | 60.1 | 42.1 |
| | 55 kph | 98.4 | 63.7 | 42.1 | 30.9 | 22.6 |
| | 67 kph | 97.5 | 59.1 | 35.0 | 23.0 | 16.6 |
| UT-NI | 45 kph | 100 | 100 | 97.8 | 87.0 | 78.1 |
| | 55 kph | 100 | 97.9 | 87.6 | 76.4 | 72.1 |
| | 67 kph | 100 | 98.3 | 83.3 | 69.3 | 69.1 |

B. Computation Requirements

Maintaining floating-point-operation counts in MATLAB with machine-optimized BLAS3 is no longer possible. Fortunately, with modern computer architectures, memory references and cache usage dominate floating-point operations in their effect on execution speed. Therefore, it was decided to use the tic and toc commands available in MATLAB to calculate execution speeds and to use execution speed as the measure of computation requirements. The comparisons obtained were performed on MATLAB version R2006a using its latest version of LAPACK and LinuxX86-optimized BLAS3 libraries. The platform included a 2.13 GHz processor with 2.0 GB RAM and 2 MB cache memory.

Table III shows the average execution times for a loop taken at an average speed of 55 kph, while starting and ending at 0 kph. For a given prediction horizon, the computation times at other speeds were comparable to these values found at 55 kph.

TABLE III

COMPUTATION TIME COMPARISON (IN MILLISECONDS) OF KALMAN PREDICTION AND UT-NI APPROACH

| | | Prediction Horizon (seconds) | | | | |
|---|---|---|---|---|---|---|
| Approach | Speed | 1 sec | 2 sec | 3 sec | 4 sec | 5 sec |
| Kalman | 55 kph | 9.7 | 18.5 | 27.5 | 36.4 | 45.0 |
| UT-NI | 55 kph | 23.1 | 36.9 | 49.1 | 63.8 | 87.7 |

From Table III, each additional second of prediction horizon adds roughly 9 ms and 14 ms to the computation time of the Kalman and UT-NI approaches, respectively. Also, it should be noted that the computation times of the UT-NI approach are roughly 7 times that of the times given by the NI approach although 13 Runge-Kutta evaluations are performed in the present work per prediction, whereas only 1 Runge Kutta evaluation was performed in the NI approach of Caveney's U.S. application Ser. No. 11/554,150.

Table III also shows a rough factor of two increase in execution time using the UT-NI over the Kalman-Prediction approach. However, any single prediction with up to a 5 second horizon is still executable within 100 ms. Furthermore, a particular property of the UT-NI approach not included in this comparison, is that the individual sigma points can be propagated in parallel, where as the Kalman prediction approach requires sequential matrix evaluations and model linearizations/discretizations. A parallel-processing architecture for computing the UT-NI approach should easily require less computation time than the Kalman approach. That said, parallel-processing versions of BLAS3 and LAPACK do exist (e.g., PBLAS and SLAPACK), and should be equally evaluated to see possible reductions in the computation time of the Kalman Prediction approach.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for predicting future states of a vehicle by combining an unscented transform (UT) with numerical integration (NI), the method comprising:
    selecting a model, by one or more processors, having n states reflecting dynamic features of the vehicle;
    inputting, as the UT, noisy sensor measurements representing a current state of the vehicle, by one or more processors, to generate (2n+1) sigma points $X_i$, where i=0, ..., 2n, each of the sigma points having n states;
    performing, as the NI, (2n+1) numerical integrations by one or more processors, each integration including propagating the n-states of the respective sigma points $X_i$ through the non-linear function $Y_i=f(X_i)$; and
    combining, by one or more processors, the propagated sigma points to generate the predicted future states of the vehicle, wherein
    the predicted future states of the vehicle are generated only when there is no measurement update or process noise so that an unscented transform is applied only to a stochastic state.

2. The method of claim 1, wherein the input sensor measurements include velocity, yaw-rate, and acceleration.

3. The method of claim 1, further comprising the step of determining a position and orientation of the vehicle using at least one of a Global Positioning System and an inertial positioning system, wherein the determined position and orientation of the vehicle further represent the current state of the vehicle.

4. The method of claim 1, further comprising the step of updating the sensor measurements, wherein the propagating step is repeated each time the sensor measurements are updated.

5. The method of claim 1, further comprising the step of representing the predicted states in a time or space based parameterization.

6. The method of claim 1, further comprising:
determining a value reflecting an uncertainty of the predicted future states.

7. The method of claim 1, wherein the predicted futures states define a predicted patch of the vehicle, the method further comprising:
sharing the predicted path of the vehicle, referred to as a first vehicle, with one or more other vehicles, referred to as a second vehicle or second vehicles;
comparing the predicted path of the first vehicle with a predicted path of one or more of the second vehicles;
determining whether the predicted paths at a same instance in time overlap; and
controlling the first vehicle to take avoidance measures.

8. The method of claim 1, wherein:
$X_i$ is an n-dimensional random variable with a mean $\overline{X}$ and a covariance $P_X$;

$$X_0 = \overline{X}$$

$$X_i = \overline{X} + (\sqrt{(n+\lambda)P_X})_i, i=1,\ldots,n$$

$$X_i = \overline{X} - (\sqrt{(n+\lambda)P_X})_{i-n}, i=n+1,\ldots,2n$$

$(\sqrt{(n+\lambda)P_X})_i$ is an i-th row or column of a matrix square root; and
$\lambda$ is a scaling parameter.

9. The method of claim 8, wherein:
a mean $\overline{Y}$ and covariance $P_Y$ are approximated by a weighted sample mean and covariance of propagated sigma points $Y_i$;

$$\overline{Y} \approx \sum_{i=0}^{2n} W_i^m Y_i;$$

$$P_Y \approx \sum_{i=0}^{2n} W_i^c (Y_i - \overline{Y})(Y_i - \overline{Y})^T;$$

$$W_0^m = \frac{\lambda}{n+\lambda};$$

$$W_0^c = \frac{\lambda}{n+\lambda} + (1 - \alpha^2 + \beta);$$

$$W_i^m = W_i^c = \frac{1}{2(n+\lambda)};$$

$\alpha$ defines a spread of sigma points around $\overline{X}$; and
$\beta$ defines prior knowledge of a distribution of $\overline{X}$.

10. The method of claim 1, wherein the NI is performed with the Runge-Kutta-Fehlberg (RFK) equations.

11. The method of claim 1, wherein the propagating the n-states of the respective sigma points $X_i$ through the non-linear function $Y_i = f(X_i)$ includes propagating, in parallel, individual sigma points by parallel-processing at a same time.

12. A system for predicting future states of a vehicle by combining an unscented transform (UT) with numerical integration (NI), the system comprising:
a first plurality of sensors, each sensor configured to output a performance measurement of the vehicle representative of a current state of the vehicle; and
a processor configured to predict future states of the vehicle based on the sensed performance measurements, the prediction calculated by the processor by generating, as the UT, (2n+1) sigma points $X_i$, where i=0, ..., 2n, each of the sigma points having n states, performing, as the NI, (2n+1) numerical integrations, each integration including propagating the n-states of the respective sigma points $X_i$ through the non-linear function $Y_i = f(X_i)$, and combining the propagated sigma points to generate the predicted future states of the vehicle, wherein the predicted future states of the vehicle are generated only when there is no measurement update or process noise so that an unscented transformation transform is applied only to a stochastic state.

13. The system of claim 12, wherein the plurality of sensors provided on the vehicle sense the velocity, yaw-rate, and acceleration of the vehicle.

14. The system of claim 12, further comprising means for determining a position and orientation of the vehicle, wherein the determined position and orientation of the vehicle further represent the current state of the vehicle.

15. The system of claim 12, further comprising:
a second plurality of sensors configured to sense a current state of at least one other vehicle;
the processor configured to predict whether a collision involving the vehicle and a sensed vehicle will occur in the future, and to control the vehicle to avoid the collision.

16. The system of claim 15, wherein the second plurality of sensors are selected from the group consisting of radars, cameras, and ultra-sonic sensors.

17. The system of claim 12, further comprising:
a wireless communication device for transmitting the predicted future states of the vehicle with at least one other vehicle, and for receiving the predicted future states of the at least one other vehicle;
the processor configured to predict whether a collision involving the vehicle and the at least one other vehicle will occur in the future based on the predicted future states of the vehicle and the received predicted future states of the at least one other vehicle, and to control the vehicle to avoid the collision.

18. The system of claim 12, further comprising:
a wireless communication device for transmitting the predicted future states of the vehicle to a roadside device;
the roadside device configured to receive the predicted future states of the vehicle and at least one other vehicle within transmission range of the roadside device, to predict whether a collision involving the vehicle and the at least one other vehicle will occur in the future based on the received predicted future states of the vehicle and the received predicted future states of the at least one other vehicle, and to transmit instructions to the vehicle and the at least one other vehicle to avoid the collision.

19. A roadside system for predicting future states of vehicles by combining an unscented transform (UT) with numerical integration (NI), the system comprising:
a plurality of sensors configured to sense the state of at least one vehicle; and
a processor configured to predict future states of each sensed vehicle based on sensed performance measurements, the prediction calculated by the processor by generating, as the UT, (2n+1) sigma points $X_i$, where i=0, ..., 2n, each of the sigma points having n states, performing, as the NI, (2n+1) numerical integrations, each integration including propagating the n-states of the respective sigma points $X_i$ through the non-linear function $Y_i=f(X_i)$, and combining the propagated sigma points to generate the predicted future states of each sensed vehicle, wherein the processor is configured to predict whether a collision involving the sensed vehicles will occur in the future based on the predicted future states of the sensed vehicles, and to transmit instructions to the sensed vehicles to avoid the collision, and the predicted future states of the vehicle are generated only when there is no measurement update or process noise so that an unscented transform is applied only to a stochastic state.

20. A non-transitory computer readable medium having stored thereon instructions for causing the computer to implement a method for predicting future states of a vehicle by combining an unscented transform (UT) with numerical integration (NI), the method comprising:

inputting, as the UT, noisy sensor measurements representing a current state of the vehicle to generate (2n+1) sigma points $X_i$, where i=0, ..., 2n, each of the sigma points having n states;

performing, as the NI, (2n+1) numerical integrations, each integration including propagating the n-states of the respective sigma points $X_i$ through the non-linear function $Y_i=f(X_i)$; and combining the propagated sigma points to generate the predicted future states of the vehicle, wherein the predicted future states of the vehicle are generated only when there is no measurement update or process noise so that an unscented transform is applied only to a stochastic state.

* * * * *